US012690005B2

(12) United States Patent (10) Patent No.: US 12,690,005 B2
Medeiros De Amorim et al. (45) Date of Patent: Jul. 21, 2026

(54) MANAGEMENT OF MEASUREMENT GAP SIGNALING

(71) Applicant: Nokia Technologies Oy, Espoo (FI)

(72) Inventors: Rafhael Medeiros De Amorim, Aalborg (DK); Mads Lauridsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 354 days.

(21) Appl. No.: 18/434,946

(22) Filed: Feb. 7, 2024

(65) Prior Publication Data

US 2024/0283571 A1 Aug. 22, 2024

(30) Foreign Application Priority Data

Feb. 16, 2023 (GB) ...................................... 2302187

(51) Int. Cl.
*H04W 64/00* (2009.01)
*G01S 5/02* (2010.01)
(Continued)

(52) U.S. Cl.
CPC ......... *H04W 64/003* (2013.01); *G01S 5/0244* (2020.05); *H04L 5/0055* (2013.01); *H04W 4/029* (2018.02); *H04W 64/00* (2013.01)

(58) Field of Classification Search
CPC ... H04W 64/00; H04W 64/003; H04W 4/029; H04W 84/06; H04W 72/04;
(Continued)

(56) References Cited

U.S. PATENT DOCUMENTS

2014/0010189 A1* 1/2014 Tian ...................... H04W 24/10
370/329
2021/0058891 A1* 2/2021 Huang .................. H04W 64/00
(Continued)

FOREIGN PATENT DOCUMENTS

WO 2022/153574 A1 7/2022

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.3.0, Dec. 2022, pp. 1-1133.
(Continued)

*Primary Examiner* — Peter Chen
(74) *Attorney, Agent, or Firm* — Nokia Technologies Oy

(57) ABSTRACT

The invention inter alia pertains to an apparatus for communication with a non-terrestrial network, NTN, the apparatus comprising means configured for:
receiving, from the network, a measurement gap configuration signaling at least comprising a measurement gap configuration indicating a measurement gap for acquiring a position estimate of the apparatus;
receiving, from the network, as part of the measurement gap configuration signaling, an allocation indicating a feedback resource for providing feedback on an attempt to acquire a position estimate;
attempting to acquire a position estimate of the apparatus during said measurement gap; and
transmitting, to the network, a feedback on the acquisition of the position estimate using said feedback resource for providing feedback on the attempt to acquire a position estimate.

17 Claims, 8 Drawing Sheets

(51) Int. Cl.
  *H04L 5/00*   (2006.01)
  *H04W 4/029*  (2018.01)
(58) Field of Classification Search
  CPC ... H04L 5/0055; H04L 1/1822; H04L 1/1861;
                 G01S 5/0244
  See application file for complete search history.

(56)       References Cited

U.S. PATENT DOCUMENTS

| | | | |
|---|---|---|---|
| 2022/0232503 A1 | 7/2022 | Cheng et al. | |
| 2023/0156656 A1* | 5/2023 | Si ........................ | H04L 5/0048 |
| | | | 455/450 |

OTHER PUBLICATIONS

"3rd Generation Partnership Project; Technical Specification Group Radio Access Network; Evolved Universal Terrestrial Radio Access (E-UTRA); Physical layer procedures (Release 17)", 3GPP TS 36.213, V17.4.0, Dec. 2022, pp. 1-584.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)", 3GPP TS 36.300, V17.3.0, Dec. 2022, pp. 1-403.

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763, V17.0.0, Jun. 2021, pp. 1-73.

"Msc-generator", Sourceforge, Retrieved on Feb. 8, 2024, Webpage available at :https://sourceforge.net/projects/msc-generator/.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321, V17.3.0, Dec. 2022, pp. 1-146.

"Revised WID on IoT NTN enhancements", 3GPP TSG RAN Meeting #96, RP-221806, Agenda: 10.2.1, MediaTek Inc., Jun. 6-9, 2022, 5 pages.

"Consideration on HARQ and GNSS enhancements", 3GPP TSG RAN WG2 #119-e, R2-2207841, Agenda: 8.6.2, ZTE Corporation, Aug. 17-29, 2022, pp. 1-4.

Search Report received for corresponding United Kingdom Patent Application No. 2302187.6, dated Aug. 15, 2023, 2 pages.

* cited by examiner

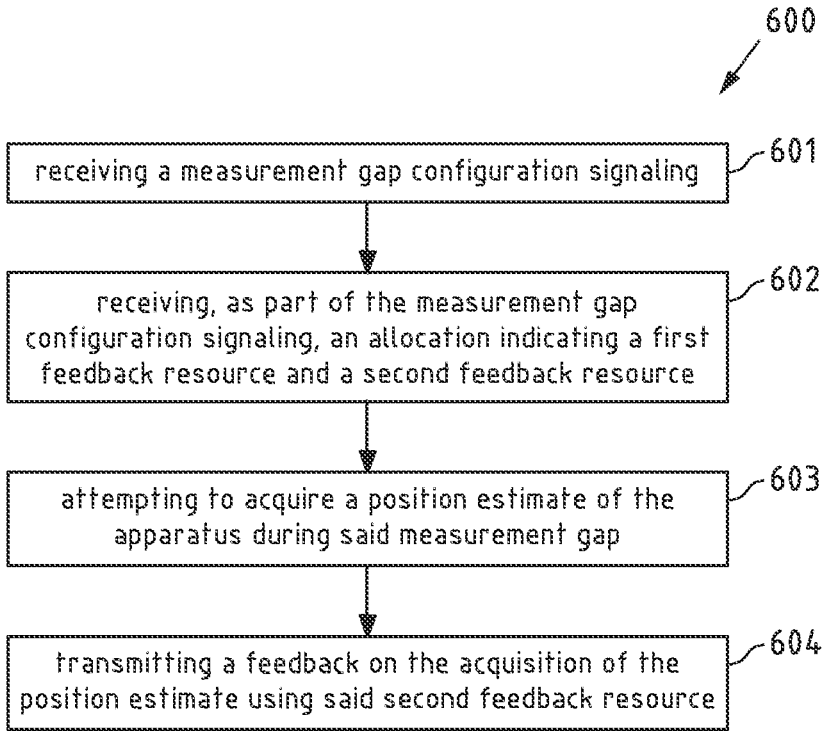

600

601 — receiving a measurement gap configuration signaling

602 — receiving, as part of the measurement gap configuration signaling, an allocation indicating a first feedback resource and a second feedback resource 603 — attempting to acquire a position estimate of the apparatus during said measurement gap 604 — transmitting a feedback on the acquisition of the position estimate using said second feedback resource

Fig.6

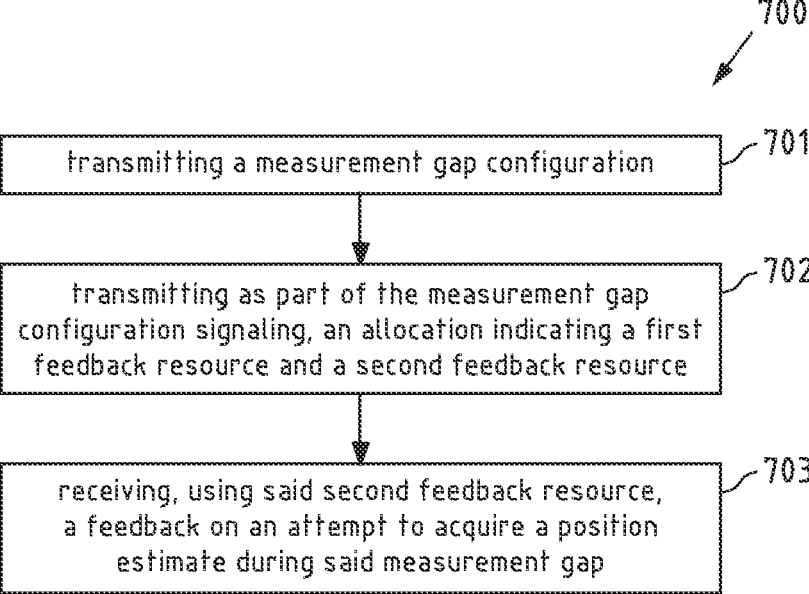

700

701 — transmitting a measurement gap configuration

702 — transmitting as part of the measurement gap configuration signaling, an allocation indicating a first feedback resource and a second feedback resource 703 — receiving, using said second feedback resource, a feedback on an attempt to acquire a position estimate during said measurement gap

Fig.7

MANAGEMENT OF MEASUREMENT GAP SIGNALING

TECHNOLOGICAL FIELD

The present disclosure is related to but not limited to communication networks as defined by the 3GPP standard, such as the 5G standard, also referred to as New Radio, NR. The disclosure in particular pertains to the interworking of narrowband and/or low power devices with non-terrestrial networks (NTN). More specifically the disclosure pertains to the management of information on (GNSS) position estimates to be acquired by the device during measurement gaps.

BACKGROUND

In the concept of non-terrestrial networks (NTN) associated to narrowband InternetOfThings (NB-IoT) and enhanced Machine Type Communication (eMTC) devices, one of the major differences between NTN operation and terrestrial networks is related to the acquisition of time and frequency compensation by the user equipment (UE).

While in terrestrial operations, for NB-IoT or eMTC, the network (NW) calculated the amount of timing offset (called "timing advance", TA) in uplink (UL) to be added by a UE in order to maintain UL frame from the transmission of all users synchronized at the base station side, this timing offset is expected to be calculated by the UE in NTN.

SUMMARY OF SOME EXEMPLARY EMBODIMENTS

In NTN, due to the high variability of the TA in Low-Earth orbit (LE) scenarios and the magnitude of the timing advance, the concept of "UE autonomous pre-compensation" of Timing Advance was introduced. The UE is expected to calculate the timing offset by estimating the round-trip time (RTT) of the physical layer. This estimation is based among other things on the UE's own position (acquired via GNSS) and the satellite ephemeris (current position, velocity and orbital parameters). Likewise, a frequency doppler offset pre-compensation in UL transmissions (and in DL reception by the UE) was also introduced using a similar estimation.

However, devices utilizing NB-IoT and eMTC are usually low cost devices, designed to save energy and be implemented in reduced sizes which implicates in many constraints. For example, such devices might reuse the RF chain for both GNSS and cellular operation. Therefore, in order to acquire the GNSS position, the cellular operations need to be suspended. Thus it can be assumed that in such scenarios the UE cannot operate GNSS and cellular modems simultaneously. Accordingly, the device has to mode to the "RRC Idle" state to utilize the GNSS. This results in GNSS operations for a new position fix for UE pre-compensation to be challenging during long cellular connection times. Accordingly, it is desirable that the UE is enabled to perform GNSS measurements while remaining RRC Connected.

In view of this background, regarding the GNSS acquisition for such devices, a "validity timer" or "validity duration" has been introduced for the GNSS information, which basically indicates the minimum refresh rate of the UE position (to account for UE movements). If the GNSS validity expires before the UE acquires a new GNSS fix, the UE is considered out of synchronization and is precluded from transmissions. An information element "GNSS-ValidityDuration" is to be included in the RRC Connection Resume Complete/Reconfiguration Complete/Reestablishment Complete/Setup Complete messages. The IE GNSS-ValidityDuration indicates the remaining GNSS validity duration or validity time in the UE, which can have values such as "s10", "s20", . . . , "min5", "min10", . . . , "infinity" (corresponding to a duration of 10 seconds, 20 seconds, . . . , 5 minutes, 10 minutes, . . . , infinity). Upon indication that the GNSS position has become out-of-date while the UE is in RRC_CONNECTED, the UE shall leave RRC_CONNECTED (with release cause 'other').

However, upon the expiration of the GNSS-validityDuration, the UE is precluded to transmit and would need to go to RRC Idle mode, before re-establishing the RRC connection towards the network. This imposes a severe limitation to the eMTC/NB-IoT operation. For example, in case very long repetitions that can last for several seconds are used for coverage enhancements, the UE might need to re-acquire a new GNSS fix amidst the repetitions, which would not be possible.

Thus, for NTN operations of NB-IoT and eMTC devices it would be desirable to enhance the GNSS operation for such devices by remaining in the "RRC Connected" mode.

Potential enhancements for improved GNSS operations may be achieved by the UE re-acquiring a GNSS position fix during the RLF procedure or by the UE re-acquiring a GNSS position fix with a new gap. The eNB may at least aperiodically trigger (e.g. via MAC CE) the UE to make a GNSS measurement and, in connected mode, the UE may report the GNSS validity duration with MAC CE.

Fort this, the network might configure and assign a GNSS measurement gap (not to be confused with the currently available measurement gaps for inter-frequency radio measurements). This procedure may be used when the GNSS validity timer is about to expire. Therefore, it would be beneficial if the network knows the current GNSS validity timer as frequently as possible, in order to avoid unnecessary GNSS measurement gaps. These gaps can be quite long and the connectivity is suspended during the gap period. According to estimations the time required to obtain the GNSS position fix (i.e. the GNSS measurement time) is in the range of 1-5 s.

It would be possible that the UE informs the network about the remaining GNSS validity timer during the RACH procedure. Therein the UE indicate the success of a GNSS position fix by sending the send the UL PRACH or performing the RACH procedure, as shown in FIG. 1. The validity timer is then reported in the "sync status info" message.

Another option may be that the UE triggers a scheduling request in order to be assigned with a scheduling grant where the new GNSS validity timer can be assigned. This scenario is illustrated in FIG. 2. This would be necessary if the UE has to provide the timer value via RRC or MAC CE.

The problem with the described approached is that in the first case, the synchronization status update will only be provided with Msg3 after at least three round-trip time (RTT) intervals (or depending on the RACH procedure used only with Msg5 after five round-trip time (RTT) intervals), as shown in FIG. 1. Likewise, in the above described second case, again at least three RTT intervals are needed. In both cases, the UE utilizes network resources and consumes energy. In light of the fact that a single RTT for a LEO NTN is in the order of 8 ms to about 30 ms, the UE also has to wait for a comparably long time before the data transfer may continue.

The approaches presented above still suffer a relative high signaling load, which also leads to long latency and high UE energy consumption, for reporting the outcome of the GNSS measurement and a potentially updated validity timer.

Thus, certain embodiments of the disclosure may have the effect of enabling the UE to efficiently inform the network about the outcome of a position estimate, such as a GNSS position estimate. Certain embodiments may have the technical effect of reducing or minimizing the network signaling overhead and energy consumption at the UE.

According to a first exemplary aspect, there is disclosed an apparatus for communication with a non-terrestrial network, NTN. The apparatus may comprise means configured for receiving, from the network, a measurement gap configuration signaling at least comprising a measurement gap configuration indicating a measurement gap for acquiring a position estimate of the apparatus. The means may further be configured for receiving, from the network, as part of the measurement gap configuration signaling, an allocation indicating a feedback resource for providing feedback on an attempt to acquire a position estimate. The means may further be configured for attempting to acquire a position estimate of the apparatus during said measurement gap. The means may further be configured for transmitting, to the network, a feedback on the acquisition of the position estimate using said feedback resource for providing feedback on an attempt to acquire a position estimate.

According to a second exemplary aspect, there is disclosed a network entity of a non-terrestrial network, NTN. The network entity may comprise means configured for transmitting, to an apparatus, a measurement gap configuration signaling at least comprising a measurement gap configuration indicating a measurement gap for acquiring a position estimate of the apparatus. The means may further be configured for transmitting, to the apparatus, as part of the measurement gap configuration signaling, an allocation indicating a feedback resource for providing feedback on an attempt to acquire a position estimate. The means may further be configured for receiving, from the apparatus using said feedback resource for providing feedback on an attempt to acquire a position estimate, a feedback on an attempt to acquire a position estimate during said measurement gap by the apparatus.

According to each of the exemplary aspects, a respective method is also disclosed.

Thus, according to the first exemplary aspect, there is disclosed a method, performed by at least one apparatus. The method may comprise receiving, from the network, a measurement gap configuration signaling at least comprising a measurement gap configuration indicating a measurement gap for acquiring a position estimate of the apparatus. The method may further comprise receiving, from the network, as part of the measurement gap configuration signaling, an allocation indicating a feedback resource for providing feedback on an attempt to acquire a position estimate. The method may further comprise attempting to acquire a position estimate of the apparatus during said measurement gap. The method may further comprise transmitting, to the network, a feedback on the acquisition of the position estimate using said feedback resource for providing feedback on an attempt to acquire a position estimate.

According to the second exemplary aspect, there is disclosed a method, performed by at least one network entity. The method may comprise transmitting, to an apparatus, a measurement gap configuration signaling at least comprising a measurement gap configuration indicating a measurement gap for acquiring a position estimate of the apparatus.

The method may comprise transmitting, to the apparatus, as part of the measurement gap configuration signaling, an allocation indicating a feedback resource for providing feedback on an attempt to acquire a position estimate. The method may comprise receiving, from the apparatus using said feedback resource for providing feedback on an attempt to acquire a position estimate, a feedback on an attempt to acquire a position estimate during said measurement gap by the apparatus.

Any of the disclosed device (apparatus, network entity) may generally be a stationary device or a mobile device. The apparatus may in particular be a terminal device such as a user equipment, e.g. mobile device, such as a smartphone, a tablet, a wearable, a smartwatch, a low power device, an IoT device, an IIoT device, a vehicle, a truck, a drone, an airplane, or the like. The apparatus may in particular be a LPWAN device, a NB-IoT device or an eMTC device. The apparatus may in particular be capable of communicating with (transmitting and receiving signals and/or data to/from) a network or a network device, such as a base station of a communication network. The apparatus may at least be able to communicate with a non-terrestrial network or non-terrestrial network entity, for instance with a satellite. Nevertheless, the apparatus may still be able to communicate with terrestrial network entities.

A network entity may be understood as a wireless communication station installed at a fixed or mobile location and may in particular be or comprise an entity of the radio access network of the communication system. For instance, the network device may be, comprise, or be part of a base station of a communication network of any generation (e.g. a gNB, eNodeB, NodeB, BTS or the like) of 3GPP standard. However, the network entity may also be or serve as a relay station (such as a mobile relay satellite communicating with a fixed terrestrial base station, either of which may be considered a network entity according to the disclosure). The network entity may be implemented in or communicate with a non-terrestrial entity, such as a satellite. In an example of a 5G network, the a non-terrestrial network entity (such as a satellite) may also comprise a gNB-DU, while the gNB-CU is implemented in a terrestrial base station. a Generally, the network entity may be or comprise a hardware or software component implementing a certain functionality. In an example, the network entity may be an entity as defined by 3GPP 5G or NR standard (also referred to as gNB).

Accordingly, while the network entity may be understood to be implemented in or be a single device or module, the network entity may also be implemented across or comprise multiple devices or modules. As such, the network entity may in particular be implemented in a satellite or be a stationary device utilizing a satellite for communication with a UE. Multiple network entities of the exemplary aspect may in particular establish a communication system or network, which may in particular be a New Radio (NR) or 5G system (5GS) or part thereof or any other mobile communications system defined by a past or future standard, in particular successors of the present 3GPP standards. The network device of the exemplary aspects may be capable of being in direct and/or indirect communication with the exemplary apparatus of the first aspect.

The means or functionality of any of the disclosed apparatuses or network entities can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to the respective exemplary aspects of the present disclosure, there is in each case also disclosed a respective apparatus or network entity comprising at least one processor and at least one memory including computer program code, the at least one memory and the computer program code configured to, with the at least one processor, cause an apparatus at least to perform a method according to the respective aspect of the present disclosure.

Any of the above-disclosed exemplary aspects may, however, in general be performed by an apparatus, which may be a module or a component for a device, for example a chip. The disclosed apparatus may comprise the disclosed components, for instance means, processor, memory, or may further comprise one or more additional components.

According to the exemplary aspects of the present disclosure, there is in each case also disclosed a computer program, the computer program when executed by a processor of an apparatus causing said apparatus to perform a method according to the respective aspect.

The computer program may in each case be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

That the apparatus is configured for communication with a non-terrestrial network is understood to mean that the apparatus may communicate with a network entity of a spaceborne or airborne network, such as satellites, medium earth orbit (MEO) satellites, low earth orbit (LEO) satellites, airborne platforms, aircrafts, airships, unmanned aerial vehicles (UAVs) or high altitude plat forms (HAPs). However, the non-terrestrial network may also comprise terrestrial components (such as terrestrial base stations) and the apparatus may also be configured to communicate directly or indirectly with such terrestrial components. Thus, a non-terrestrial network may be understood as an at least partially non-terrestrial network, i.e. a network which has at least a non-terrestrial component (such as a spaceborne or airborne network entity, e.g. serving as a base station or relay for a base station).

The apparatus may receiving, from the network, a measurement gap configuration signaling, which at least comprises a measurement gap configuration indicating a measurement gap for acquiring a position estimate of the apparatus. The position estimate may for instance be acquired by means of a global navigation satellite system, GNSS. Alternatively, the position estimate may be acquired by means of an NTN positioning method or another positioning method of a cellular or non-cellular network. Accordingly, the network entity may comprise means configured for transmitting such measurement gap configuration signaling. In an example, the measurement gap configuration is received in a medium access control, MAC, control element, CE. The network may aperiodically assign a measurement gap and thereby trigger the apparatus to make a positioning measurement.

A measurement gap for acquiring a position estimate of the apparatus may also be referred to as "synch measurement gap" or in the case of acquiring the position estimate from GNSS it may also referred to "GNSS measurement gap". As already explained above, a measurement gap may be understood as a time interval or time window in which the apparatus suspends communication with the (non-terrestrial) network but is able to acquire a position estimate e.g. via a GNSS. However, as will be explained in more detail below, the apparatus may not need to completely disconnect from the non-terrestrial network but may shortly after the measurement gap continue with the communication over the non-terrestrial network. Examples of a global navigation satellite system, GNSS, are the Global Positioning System (GPS), the Global Navigation Satellite System (GLO-NASS), the China's BeiDou Navigation Satellite System, and the European Union's Galileo. A position estimate may also be referred to as position fix or GNSS fix, in case obtained from a GNSS.

The measurement gap configuration may in particular indicate the time resource for the measurement gap. For instance, the measurement gap configuration may comprise information indicating a certain time resource (such as a frame, subframe or slot number, e.g. relative to the time resource in which the measurement gap configuration is received) for the measurement gap (e.g. indicating the time resource at which the measurement gap starts). For instance, in case the measurement gap configuration is received in time resource (e.g. slot) n, the measurement gap configuration may indicate a delay such as X time resources (e.g. slots) to schedule the start of the measurement gap at time resource (e.g. slot) n+X. The measurement gap configuration may also comprise information indicating a duration of the measurement gap. For instance, the measurement gap configuration may indicate a duration of MG time resources (e.g. slots) for the measurement gap. Accordingly, with the measurement gap configuration, the measurement gap may be assigned or scheduled for the apparatus by the network. The measurement gap configuration may in particular be provided as MAC-CE.

The measurement gap configuration signaling may in particular comprise the above described measurement gap configuration. However, the measurement gap configuration signaling may comprise further messages. For instance, the measurement gap configuration signaling may further comprise a scheduling (e.g. as downlink control information, DCI) for scheduling the reception of the measurement gap configuration. Such additional messages may also comprise additional information, as will be described in further detail below.

As part of the measurement gap configuration signaling (e.g. in the measurement gap configuration or the respective scheduling), the network entity transmits and the apparatus also receives an allocation indicating a feedback resource for providing feedback on the acquisition of the position estimate. The allocation of the feedback resource for providing feedback on an attempt to acquire a position estimate may in particular indicate a resource for provide an acknowledgement or negative acknowledgement regarding the acquisition of the position estimate. For instance, the feedback resource allocation for providing feedback on an attempt to acquire a position estimate may indicate a time resource relative to the time resource of the (e.g. end of the) measurement gap. For instance, the feedback resource allocation for providing feedback on an attempt to acquire a position estimate may indicate a delay such as K2 time resources (e.g. slots). For instance, in case the measurement gap configuration is received in time resource (e.g. slot) n, the feedback resource for providing feedback on an attempt to acquire a position estimate may be allocated K2 time resources (e.g. slots) after the measurement gap, i.e. in light of the above examples to time resource (e.g. slot) n+X+MG+K2. As will be explained in more detail below, the feedback resource for providing feedback on an attempt to acquire a position estimate may be a resource of a process (such as a HARQ process) associated with the measurement gap configuration signaling.

Since a feedback resource for providing feedback on the acquisition of the position estimate is already allocated as part of the measurement gap configuration signaling, this will allow the apparatus to quickly provide respective feedback after a successful or unsuccessful acquisition of a position estimate. The network signaling overhead is also minimized by using the measurement gap configuration (e.g. utilizing MAC-CE) to also configure the (second) feedback resource.

The measurement gap configuration signaling may be obtained by the network, since the network is aware of the fact that the validity timer (indicating the (remaining) time in which the position of the apparatus may be assumed to be known sufficiently reliable for the UE to perform autonomous compensation of timing advance, as explained above) of the apparatus is about to run out.

The apparatus may then attempt to acquire a position estimate of the apparatus during the scheduled or assigned measurement gap. The apparatus may temporarily suspend the communication with the non-terrestrial or cellular network and use its communication means for the attempt to acquire a position estimate.

This may be necessary as the apparatus may not be configured for cellular network communication and reception of signals for the position estimate at the same time.

The apparatus may then transmit, to the network, a feedback on the acquisition of the position estimate using said feedback resource for providing feedback on an attempt to acquire a position estimate and the network entity may receive the corresponding feedback. The feedback on the acquisition of the position estimate may indicate the status of the acquisition, e.g. whether the acquisition of a position estimate was successful or unsuccessful. The apparatus may for instance transmit a acknowledgement (ACK) or negative acknowledgement (NACK). Thus, only a single bit may be needed for providing the feedback on the acquisition of the position estimate. However, when using more than one bit for the feedback, it may also be possible to provide further information (e.g. an indication of a new validity timer of the newly acquired position estimate, as will be explained further below). As already state above, since the (second) feedback resource for providing feedback on the acquisition of the position estimate is at this point already allocated for the apparatus, this allows the apparatus to quickly provide the feedback after a successful or unsuccessful acquisition of a position estimate. Specifically, the feedback may be provided much earlier than 3 or 5 RTTs as it is the case for having to use a random access procedure or a scheduling request (as described above and illustrated in FIGS. 1 and 2). In certain embodiments, it may even be possible for the apparatus to provide such feedback even before the end of the measurement gap, if such an early feedback time resource is configured, as will be explained further below.

In an example, the apparatus may receive, from the network, as part of the measurement gap configuration signaling (e.g. in the measurement gap configuration or the respective scheduling), an allocation indicating a feedback resource for providing feedback on the reception of the measurement gap configuration; and transmit, to the network, before the measurement gap, a feedback on the reception of the measurement gap configuration using said feedback resource for providing feedback on the reception of the measurement gap configuration. The network entity may correspondingly be configured receive such feedback. The allocation of the feedback resource for providing feedback on the reception of the measurement gap configuration may in particular indicate a resource for provide an acknowledgement or negative acknowledgement regarding the reception of the measurement gap configuration. In case the measurement gap configuration is provided as MAC-CE, an ACK or NACK to the MAC-CE may be provided on this feedback resource for providing feedback on the reception of the measurement gap configuration. For instance, the feedback resource allocation for providing feedback on the reception of the measurement gap configuration may indicate a time resource relative to the time resource in which the measurement gap configuration is received. For instance, the allocation for the feedback resource for providing feedback on the reception of the measurement gap configuration may indicate a delay such as K time resources (e.g. slots). For instance, in case the measurement gap configuration is received in time resource (e.g. slot) n, the feedback resource for providing feedback on the reception of the measurement gap configuration may be allocated to time resource (e.g. slot) n+K.

The feedback resource for providing feedback on the reception of the measurement gap configuration may herein also be referred to as the "first" feedback resource. The feedback resource for providing feedback on an attempt to acquire a position estimate may herein also be referred to as the "second" feedback resource.

The (first) feedback resource for providing feedback on the reception of the measurement gap configuration may be a first hybrid automatic repeat request, HARQ, feedback resource of a HARQ process associated with the measurement gap configuration signaling. The HARQ process may allow to provide feedback, such as an ACK or NACK, on the reception of measurement gap configuration. Accordingly, the described acknowledgements or negative acknowledgements provided on the first and/or second feedback resources may be a HARQ ACK or HARQ NACK.

Likewise, the (second) feedback resource for providing feedback on the attempt to acquire a position estimate may be a second HARQ feedback resource of a HARQ process associated with the measurement gap configuration signaling. Specifically, the first feedback resource and the second feedback resource may both be HARQ feedback resources of the same HARQ process. In other words, the apparatus may re-use the resources of the HARQ process for providing feedback. This allows the apparatus to efficiently inform the network about the outcome of a position fix by a re-use of the HARQ process.

The (second) feedback resource for providing a feedback on the attempt to acquire a position estimate may comprise a resource scheduled within the measurement gap and/or a resource scheduled after the measurement gap. As already explained above, the second feedback resource may for instance be allocated K2 time resources after the time resources MG of the measurement gap starting X time resources after the time resource n configuring the measurement gap, i.e. at time resource n+X+MG+K2. Additionally or alternatively, a resource within the measurement gap (i.e. before the end of the measurement gap duration) may be reserved for providing a feedback on the attempt to acquire a position estimate. For instance, the second feedback resource allocation may additionally or alternatively indicate a time resource relative and prior to the time resource of the (e.g. end of the) measurement gap. For instance, the second feedback resource allocation may indicate K3 time resources (e.g. slots), so that the second feedback resource may be allocated K3 time resources (e.g. slots) before the end of the measurement gap, i.e. in light of the above examples to time resource (e.g. slot) n+X+MG−K3. The feedback resource before the end of the measurement gap may also be indicated as a scale or percentage of the measurement gap duration.

In an example, in case a position estimate of the apparatus is acquired during said measurement gap, the apparatus may transmit, to the network, validity information indicating a validity duration of the acquired position estimate. The apparatus will typically also obtain or be able to determine the (remaining) validity duration (also referred to as validity time) for the newly acquired position estimate. Such (updated) validity information may be transmitted to the network as an information element ValidityDuration or GNSS-ValidityDuration, for instance, indicating the remaining validity duration in the apparatus. However, as will be explained in more detail below, the apparatus may determine whether it is necessary to transmit such validity information to the network and may even refrain from such a transmission.

The validity information indicating a validity duration (e.g. in second or minutes) of the acquired position estimate may be transmitted to the network (and received by a respective network entity) in different manners. In one example, the validity information may be the attached or piggybacked to data to be transmitted. The apparatus will usually have data to be transmitted to the (non-terrestrial) network anyways after successful acquisition of the position estimate, suspension of the positioning operation and reactivation of the network operation. The apparatus may send the validity information on resources of a scheduling grant (e.g. dedicated for transmission of the validity information. For instance, the apparatus may receive the scheduling grant automatically in response to a transmitted acknowledgement regarding the acquisition of the position estimate or in response to a specific scheduling request from the apparatus. In an example (in particular after a scheduling grant as just described), the apparatus may transmit the validity information in a MAC CE. Alternatively, the apparatus may transmit the validity information via RRC signaling. In one example, and as will be explained in more detail below, the validity information indicating a validity duration may also be transmitted in or as part of the feedback on the attempt to acquire a position estimate (i.e. for instance as part of the HARQ ACK/NACK).

In an example, in case a position estimate of the apparatus is acquired during said measurement gap, the apparatus may determine whether and/or how to transmit validity information indicating a validity duration of said acquired position estimate to the network. For instance, in case it is determined that validity information is to be transmitted to the network, the apparatus may transmitting said validity information indicating a validity duration of said acquired position estimate to the network. For instance, in case it is determined that no validity information is to be transmitted to the network, the apparatus may refrain from transmitting said validity information indicating a validity duration of said acquired position estimate to the network.

Said determining whether and/or how to transmit said validity information may be based on the validity duration of said acquired position estimate and/or the validity duration of the previous position estimate. In particular, in an example, said determining may be based on a comparison of the validity duration of said acquired position estimate and the validity duration of the previous position estimate. For instance, in case the validity duration of said acquired position estimate is at least equal to (i.e. equal to or greater than) the (last reported) validity duration of the previous position estimate, the apparatus may determine that the updated validity information shall be provided to the network. The apparatus may piggyback the validity information to a subsequent transmission. However, in case the validity duration of said acquired position estimate is smaller than the (last reported) validity duration of the previous position estimate, the apparatus may need to transmit a scheduling request in order to provide the updated validity information. In an example, said determining may be based on a required remaining connection time and specifically based on a comparison of a required remaining connection time and the validity duration of the previous position estimate. For instance, in the above case, that the validity duration of said acquired position estimate is at least equal to (i.e. equal to or greater than) the (last reported) validity duration of the previous position estimate, the apparatus would usually transmit the validity information to the network. However, in case a required remaining connection time is shorter than the validity duration of the previous position estimate (e.g. because there is presently not much data left to transmit), the apparatus may determine that his no need for informing the network of updated validity information indicating an updated and longer validity duration. Allowing the apparatus to determine whether and/or how to provide an updated (longer) validity timer may further reduce the signaling overhead and energy consumption.

In an example, said feedback on the attempt to acquire a position estimate is configured to indicate an acknowledgement or a negative acknowledgement of an acquisition of the position estimate. As already discussed, this may already be achieved by a single bit value. However, the feedback on the attempt to acquire a position estimate may also be configured to indicate validity information indicating the validity duration. In one example, it may not be necessary to indicate the actual value of the validity duration. Rather, it may be sufficient to sufficient to indicate whether there is a change of a validity duration of an acquired position estimate. The feedback on the attempt to acquire a position estimate may in particular indicate a change of a validity duration of an acquired position estimate relative to the validity duration of the previous position estimate. This may already be achieved with a two bit value allowing for differentiating four cases, namely 1) the attempt to acquire a position estimate failed, 2) the attempt to acquire a position estimate was successful without any change of the validity timer, 3) the attempt to acquire a position estimate was successful with an increase of the validity timer (e.g. by one index of a ValidityDurationIE, such as the GNSS-ValidityDuration IE) and 4) the attempt to acquire a position estimate was successful with a decrease of the validity timer (e.g. by one index of a ValidityDurationIE, such as the GNSS-ValidityDuration IE).

In one example, in case a position estimate of the apparatus is acquired during said measurement gap, the apparatus may transmit an acknowledgement of an acquisition of the position estimate as said feedback on the attempt to acquire a position estimate, in case the validity duration of said acquired position estimate is the same or longer than the validity duration of the previous position estimate. However, in case the validity duration of said acquired position estimate is smaller than the validity duration of the previous position estimate transmitting, the apparatus may nevertheless transmit a negative acknowledgement of an acquisition of the position estimate as said feedback on the attempt to acquire a position estimate. The network may, in response to the negative acknowledgement, transmit a scheduling grant to the apparatus in order to report the value of the validity duration of the acquired position estimate.

Accordingly, the network entity may, based on the received feedback on an attempt to acquire a position estimate during said measurement gap, schedule a resource for the apparatus to transmit validity information indicating a validity duration of a position estimate acquired by the apparatus. For instance, the network entity may (automatically) schedule a resource in response to receiving an acknowledgement of an acquired position estimate, so that the apparatus may transmit the validity information via a scheduling grant. The apparatus may then await such a scheduling of the network in response to an acknowledgement, in particular without having to transmit a separate scheduling request. For instance, the network entity may not schedule a resource in case of receiving a negative acknowledgement of an acquired position estimate from the apparatus. However, as explained above, the network entity may, in one example, also schedule a resource for the apparatus to transmit validity information in response to a negative acknowledgement (which may be understood by the network to mean that a position estimate is acquired with a validity duration shorter than the one of the previously reported duration), so that the apparatus may transmit the validity information via a scheduling grant.

In case a position estimate of the apparatus is not acquired during said measurement gap, the apparatus may transmit, to the network, a negative acknowledgement as a feedback on the acquisition of the position estimate using said feedback resource for providing feedback on an attempt to acquire a position estimate. Nevertheless, the network may still allow the apparatus to use uplink resources and transmit data even after the expiry of the validity timer. For instance, the network may allow the apparatus to perform an uplink transmission for a limited time and/or for one UL transmission. Additionally or alternatively, the network may automatically send assign a further measurement gap to the apparatus, i.e. transmit a further measurement gap configuration signaling as described herein.

In an example, said measurement gap configuration signaling comprising a scheduling message for receiving the measurement gap configuration. As described above, the scheduling message may in particular be a DCI message. The scheduling message may, for instance, be used to allocate one or more of the feedback resources described herein. For instance, the scheduling message may indicate the allocation for the feedback resource for providing feedback on the acquisition of the position estimate, e.g. by indicating a number of time resources e.g. relative to the end of the measurement gap, e.g. K2 or K3 as discussed above.

In case a position estimate of the apparatus is acquired, the apparatus may estimate a round trip time (RTT) based on the acquired position estimate. The RTT may be a physical RTT. Generally, the RTT is understood to be the amount of time it takes for a signal to be sent plus the amount of time it takes for acknowledgement of that signal having been received. That is in the present case a signal being transmitted from the apparatus to the non-terrestrial network (e.g. a satellite) and back. For the estimation, the apparatus may take into account not only the position estimate of the apparatus acquired via a respective positioning method but also other information such as the ephemeris (e.g. current position, velocity and/or orbital parameters) of the respective spaceborne or airborne network entity (such as a satellite) with which the apparatus communicates. The apparatus may thus utilize the acquired position estimate for determine a timing offset or timing advance (TA). The apparatus is thus enabled to compensate the timing offset based on the acquired position estimate and may transmit data based on a determined timing offset having been determined based on the acquired position estimate. Generally, it may also be possible to utilize the acquired position estimate for other corrections or compensations. For instance, the apparatus may utilize the acquired position estimate for compensating in the frequency domain, for instance for compensating a frequency offset.

The apparatus may be (or may be a part of) a wireless terminal, a low power wide area network (LPWAN) device, a narrowband Internet of things (NB-IoT) device, and/or an enhanced Machine Type Communication (eMTC) device. Such devices are usually restricted regarding power supply, computation and communication capabilities, so that the approaches described herein are particularly useful for such devices.

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 6 shows a flow chart of an example embodiment of the first aspect of the present disclosure;

FIG. 7 shows a flow chart of an example embodiment of the second aspect of the present disclosure;

DETAILED DESCRIPTION OF THE FIGURES

The following description serves to deepen the understanding of the present disclosure and shall be understood to complement and be read together with the description of example embodiments of the present disclosure as provided in the above SUMMARY section of this specification.

Figure 1:
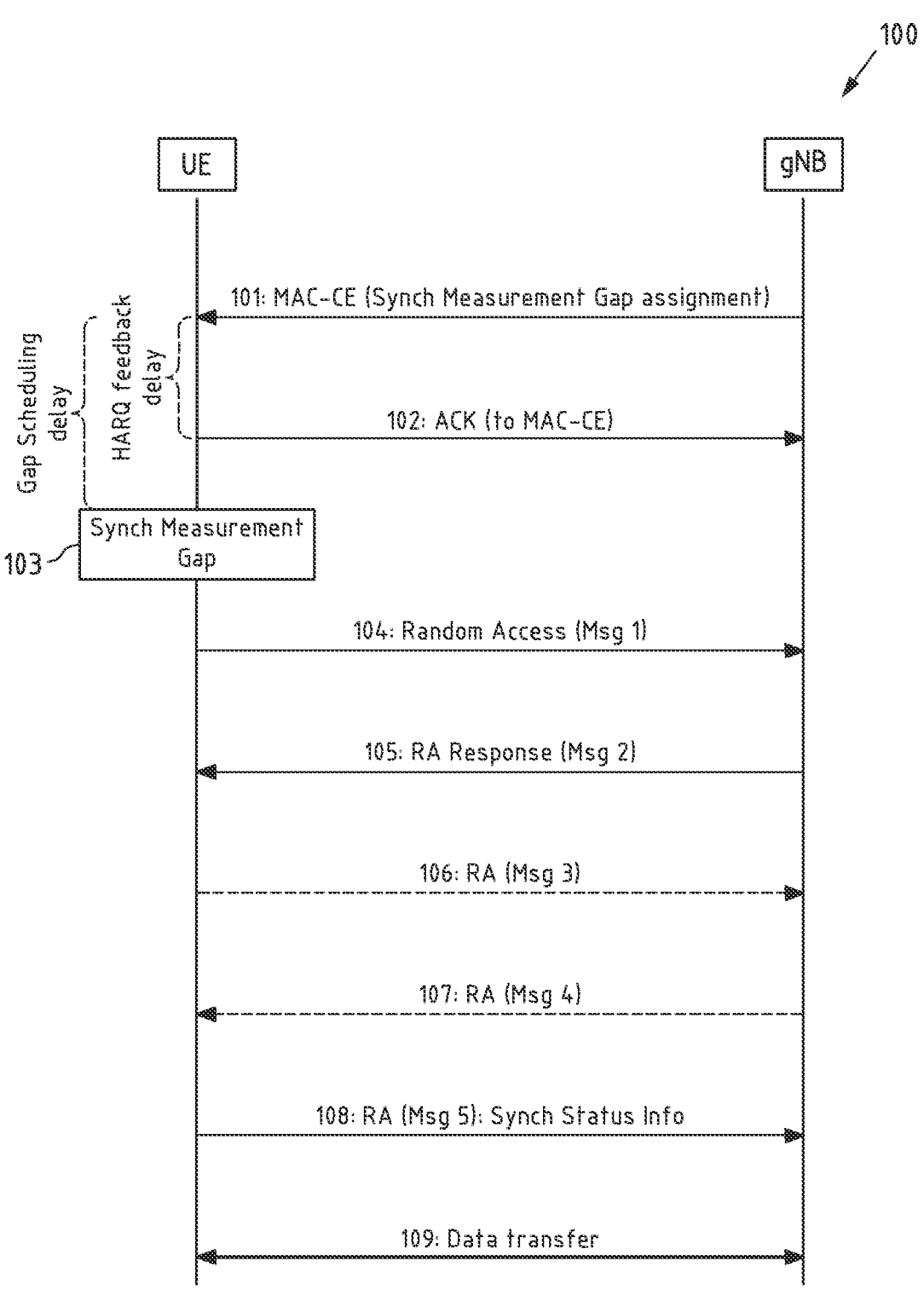
FIG. 1 shows signaling diagrams for transmitting feedback after attempting to acquire a position estimate during a measurement gap utilizing a RACH procedure.
Figure 2:
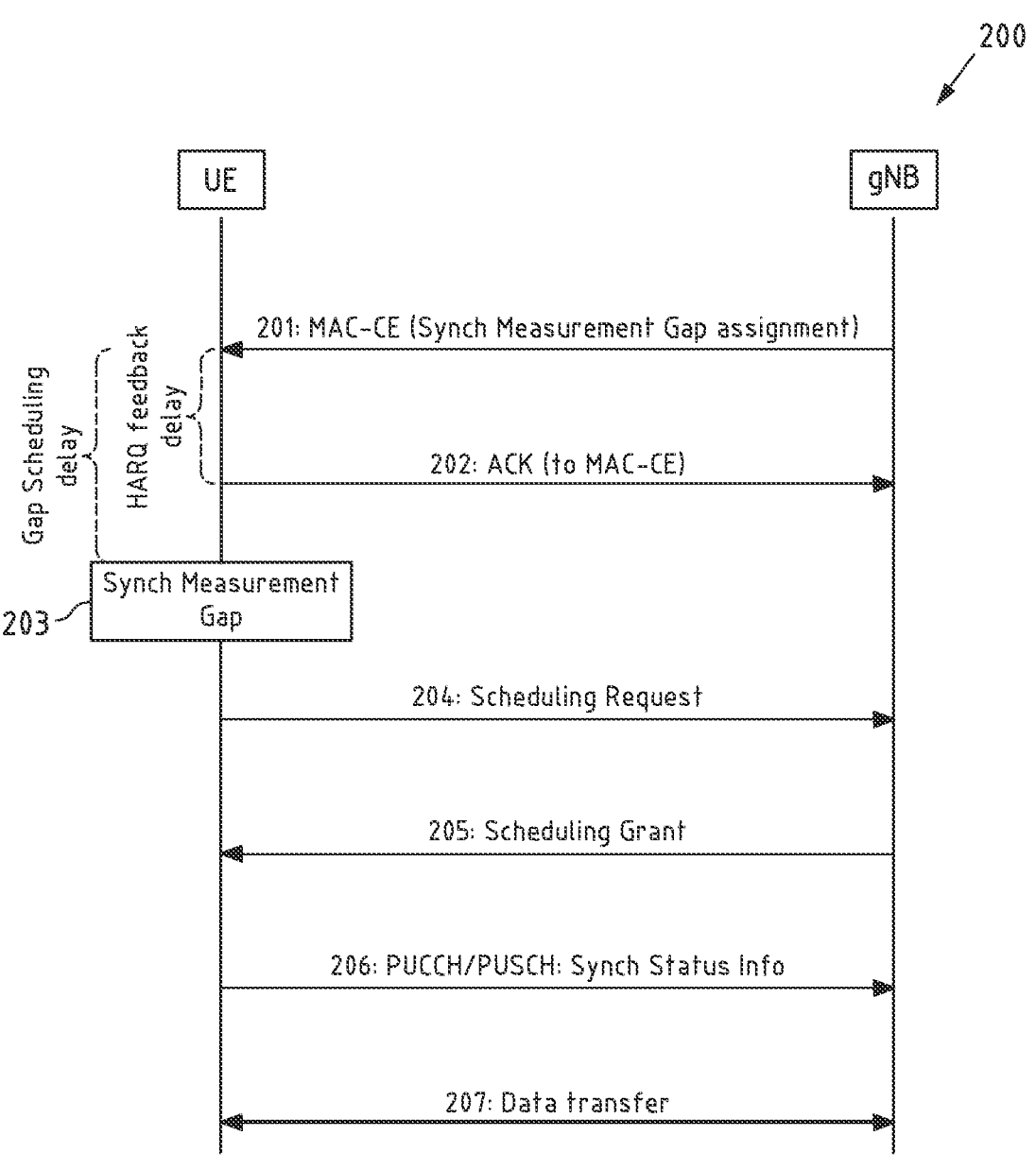
FIG. 2 shows signaling diagrams for transmitting feedback after attempting to acquire a position estimate during a measurement gap utilizing a scheduled grant.

FIGS. 1 and 2 show signaling diagrams 100, 200 for transmitting feedback after attempting to acquire a position estimate during a measurement gap utilizing a RACH procedure and a scheduled grant.

As shown in FIG. 1, it would be possible that the UE informs the network about the remaining GNSS validity timer during the RACH procedure. Therein the UE indicates the success of a GNSS position fix by sending the UL PRACH or performing the RACH procedure. After the UE has received a Synch Measurement Gap assignment in a MAC-CE (action 101), it acknowledges the reception via a HARQ feedback (action 102). After the measurement gap 103, the UE then needs to perform a random access procedure with either a 3-message procedure (actions 104, 105, 109) or with a 5-message procedure (actions 104, 105, 106, 107, 108). The validity timer is then reported in the "sync status info" message (action 108) and the UE may continue with the data transfer (action 109). However, the problem with the described approached is that the synchronization status update will only be provided with the third message after at least three round-trip time (RTT) intervals or even only with the fifth message after five round-trip time (RTT) intervals.

As shown in FIG. 2, the UE may also us a scheduled grant. Again, the UE may receive a Synch Measurement Gap assignment in a MAC-CE (action 201) and acknowledge the reception via a HARQ feedback (action 202). After the measurement gap 203, the UE may then transmit a scheduling request (action 204) in order to be assigned with a scheduling grant (action 205). The UE may then transmit an updated GNSS validity timer and continue with the data transfer (action 207). Again, at least three messages (actions 204, 205, 206) are and thus three RTT intervals are needed for transmitting feedback on the attempt to obtain a position estimate during the measurement gap 203.

The approaches of FIG. 1 and FIG. 2 presented above suffer a relative high signaling load, which also leads to long latency and high UE energy consumption, for reporting the outcome of the GNSS measurement and a potentially updated validity timer.

In the following an, an example communication system, in which the present disclosure may be applied, is described. While the specific radio system in the examples below is a 5G system, this is only to be considered a non-limiting example.

Figure 3:
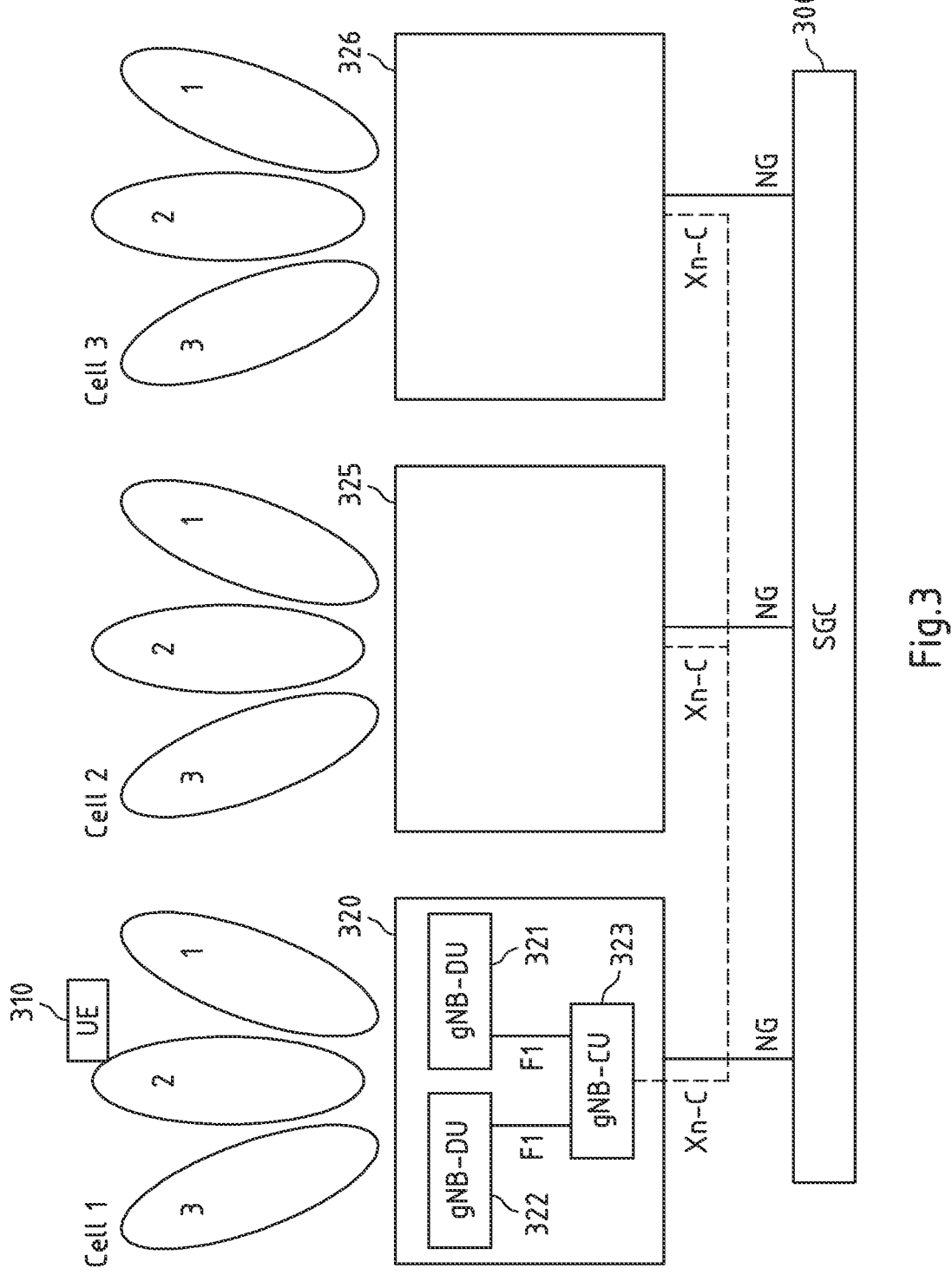
FIG. 3 shows a schematic diagram illustrating an example radio environment in which exemplary embodiments of the present disclosure may be performed.

FIG. 3 shows a 5G communication network, which introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as F1 interface). The DU is a logical node including a subset of the gNB functions, depending on the functional split option.

As shown in FIG. 3, a first user equipment (UE) 310, as an example of a first terminal device of the exemplary aspects of the present disclosure, is connected to a cell 1 of a network entity or base station, a gNB 320 via a communication beam of the cell 1. In the example shown in FIG. 3, the gNB 320 is provided with a CU 323 and two DUs 321 and 322 being connected to the CU 323 by a F1 interface. Furthermore, as shown in the example of FIG. 3, there is a plurality of further cells to which the first UE 310 can connect. Naturally, in each cell, a plurality of UEs may be present and connected to the respective cell. Similarly to cell 1, cells 2 and 3 are controlled by gNB 325 and 326, respectively, and each provides a plurality of beams 1 to 3, which may be used for beam diversity or beam hopping. As shown in FIG. 3, each base station or gNB of the cells is connected to a core network, such as a 5GC, via respective interfaces, indicated as NG interfaces. Furthermore, each gNB of the cells is connected with each other by means of a specific interface, which is referred to e.g. as an Xn-C interface. Any of these network entities, such as the gNB, gNB-DU, gNB-CU and/or 5GC, may individually or together be an example of a base station or a part thereof according to the present disclosure.

Figure 4:
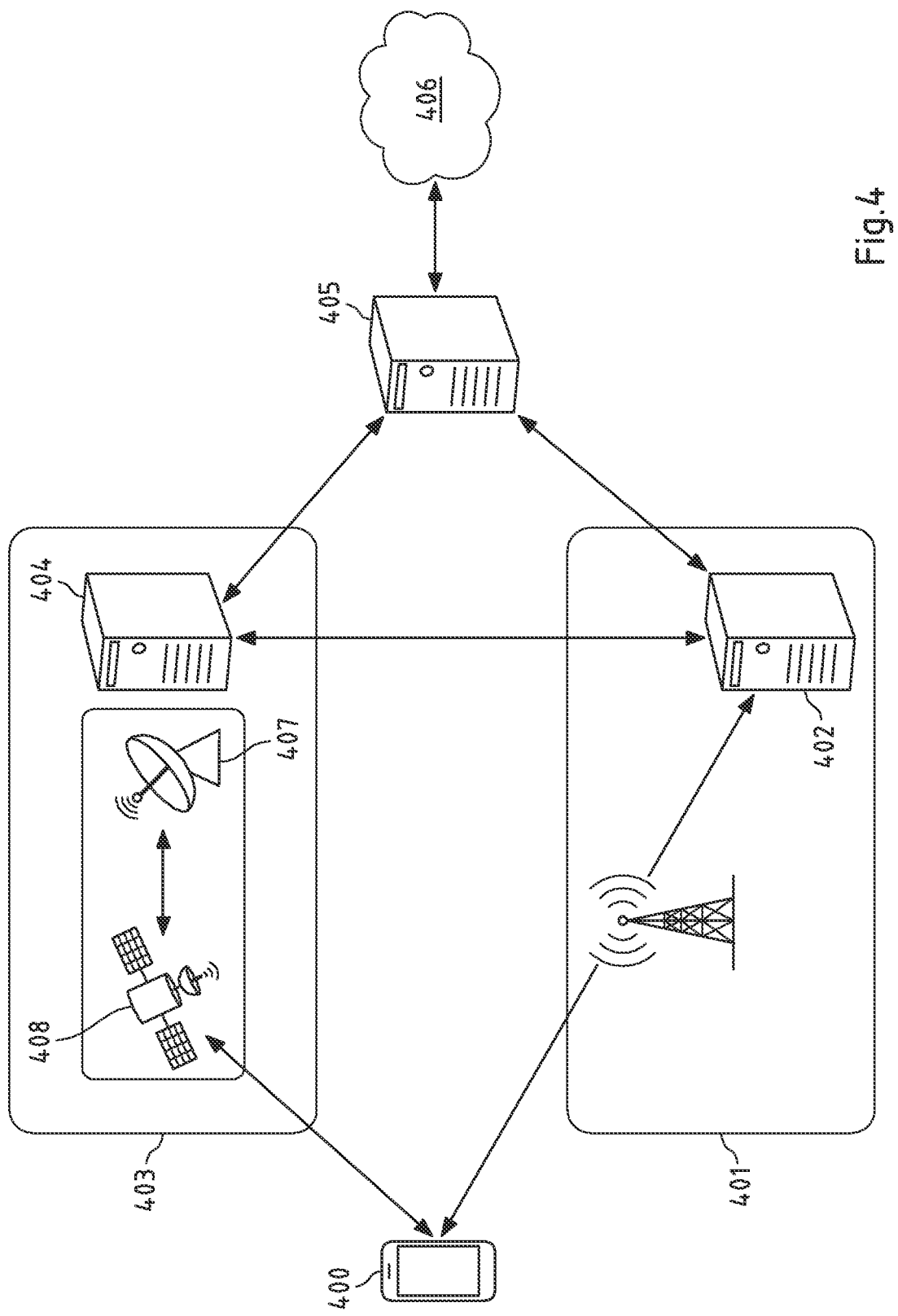
FIG. 4 shows a further schematic diagram illustrating an example radio environment in which exemplary embodiments of the present disclosure may be performed.

The communication between the UE and the respective network entities or base station may at least partially be realized via a non-terrestrial network, as exemplarily shown in FIG. 4. The UE 400 may communicate via a Uu interface not only with a terrestrial NG-RAN 401 with gNB 402, but also with an NTN-based NG-RAN 40 with gNB 404. In each case, the respective gNB communicates with a 5GC 405 and datam network 406. The gNB 404 communicates with the UE 400 via an NTN gateway 407 and satellite 408 functioning as a relay. While in the example shown, the gNB is completely terrestrial, it is also possible that the gNB functionality is completely or at least partially implemented in the satellite 408. For instance, satellite 408 may comprise a gNB-DU, while the terrestrial gNB 404 is then a gNB-CU. In each of the cases, the UE ma, however, also be configured to only communicate with the non-terrestrial part 403 of the network.

In connection with FIGS. 5, 6 and 7, embodiments are discussed in the following allowing for a lower overhead and lower completion time (and thus lower UE energy consumption) for the UE to update the information about the success of the acquired GNSS information after a GNSS measurement gap (also referred to as a "Synch Measurement Gap" below). Even though the following embodiments are described with respect to a GNSS positioning method and a 5G network, the described embodiments equally apply to other positioning methods and other network generations (in particular future generations of networks standardized by the 3GPP).

Figure 5:
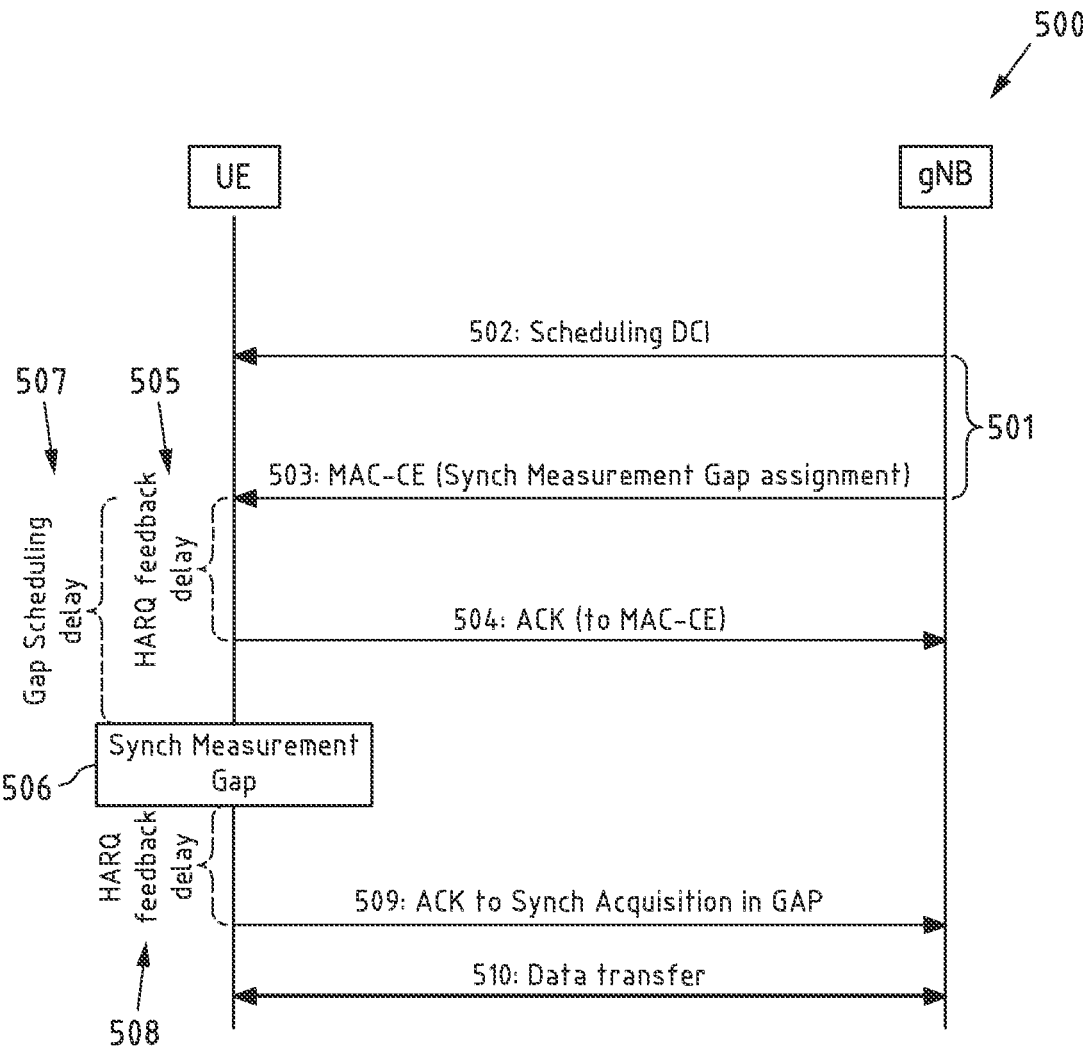
FIG. 5 shows a signaling diagram of an example embodiment of the present disclosure.

Therein, FIG. 5 shows a signaling diagram 500 of an example embodiment of the present disclosure, while FIG. 6 shows a flow chart 600 of an example embodiment of the first aspect of the present disclosure and FIG. 7 shows a flow chart 700 of an example embodiment of the second aspect of the present disclosure.

The UE will receive a measurement gap configuration signaling (actions 501, 601, 701) comprising a scheduling DCI message (action 502) for scheduling the reception of the measurement gap configuration and the reception of the measurement gap configuration (action 503). The scheduled MAC-CE is received at downlink slot n (HARQ feedback delay 505) scheduling the Synch Measurement Gap (action 503). As part of the measurement gap configuration signaling, the UE will receive an allocation indicating a first feedback resource for providing feedback on the reception of the measurement gap configuration and a second feedback resource for providing feedback on the acquisition of the position estimate (actions 602, 702). The UE will then send an UL HARQ feedback to acknowledge the successful reception of the scheduling using the first feedback resource, i.e. at UL slot n+K.

The Synch Measurement Gap 506 assigned by the MAC-CE will happen starting after a Gap Scheduling delay 507 at UL slot n+X with X>K. The reason is that the UE is not able to transmit the HARQ feedback during the Synch Measurement Gap 506 and therefore the UE has to transmit before the measurement gap 506 is started, i.e. X>K.

In the following the UE may differentiate between different cases and corresponding actions depending on whether a position estimate can successfully be obtained during the measurement gap and on the corresponding validity timer of the position estimate.

1) If the attempt to acquire GNSS information (i.e. a GNSS position estimate) in action 603 is successful during the Synch Measurement Gap 506 and the GNSS validity timer is at least equal to (or greater than) the last reported GNSS validity timer by the UE, the UE may proceed as follows.

The UE may use the second feedback resource reserved for the same HARQ process, which has already been used to provide feedback (in action 504) on the MAC-CE (from action 503), in order to send a second HARQ ACK information (action 509, 604, 704) at slot n+X+MG+K2 in order to transmit a positive feedback on the acquisition of the position estimate using said second feedback resource. Therein, MG is the Synch Measurement Gap duration and K2 indicates the interval between the end of the measurement gap and the scheduled resource for the second HARQ feedback, i.e. the second feedback resource.

For instance, the network may configure K2 as part of the measurement gap configuration (action 503) or indicate K2 as part of the scheduling DCI (action 502) for the MAC-CE. When configured as part of the measurement gap configuration, the configuration may might follow the synchronous behavior for HARQ (as used in LTE, where the HARQ feedback is provided in multiples of 8 ms from the DL transmission).

The UE may then transmit validity information indicating a validity duration to the network. In one example, the UE transmits the updated GNSS validity timer piggybacked to a subsequent data transmission (e.g. such as data transmission in action 510), which means the UE will not spend additional transmissions to provide the updated timer.

However, it may be left to the UE implementation to decide whether to provide the updated value of the validity timer or whether to continue with the old GNSS validity timer. For example, the UE may determine that the expected remaining connection time (required for transmitting the remaining data) is shorter than the old GNSS validity timer (which is therefore sufficient) and thus there is no need for providing a higher time value to the network.

2) If the attempt to acquire GNSS information (i.e. a GNSS position estimate) in action 603 is successful during the Synch Measurement Gap 506 and the GNSS validity timer is smaller than the last reported GNSS validity timer by the UE, the UE may proceed as follows.

The UE may apply the same procedure as discussed above for providing feedback on the acquisition of the position estimate using said second feedback resource, i.e. for providing a HARQ ACK (action 509,604, 704). However, in this case, the UE will subsequently have to transmit a scheduling request to provide the updated GNSS validity timer before the new GNSS validity timer expires, which would be before the network expects (based on the old GNSS validity timer).

3) If the acquisition of GNSS information in action 603 is not successful during the Synch Measurement Gap 506 but the UE may still be allowed to perform at least one UL transmission, the UE may proceed as follows.

The UE may use a second feedback resource reserved for the same HARQ process to send a second HARQ reply (action 509, 604, 704), but this time with a "NACK" content. Again the determining of the transmission resource (i.e. second feedback resource) can be based on the same already approach described above. The network may provide the above uplink resource to be used by a UE with either limited remaining GNSS validity time or an expired GNSS validity timer (i.e. the UE is allowed to perform this UL transmission). The network can configure whether the UE is allowed to transmit based on how outdated the GNSS validity timer is, e.g. expired within the last 100 ms.

Furthermore, a second Synch Measurement Gap might be automatically assigned to the UE based on the NACK indication.

In any case the apparatus may estimate a round trip time, RTT, between the apparatus and the network entity (such as a satellite) based on the acquired position estimate (if successful) or on the previous position estimate. This allows the UE to determine a timing offset or timing advance based on the acquired position estimate and to perform UE autonomous pre-compensation, i.e. compensate the respective timing offset or timing advance. For the data transfer (action 510) a corresponding TA compensation can the be performed.

In one embodiment, when the network receives a positive feedback on the second feedback resource, such as a HARQ ACK, indicating a successful GNSS position measurement, the network may automatically respond with a scheduling grant, such that the UE can provide the updated GNSS validity timer (for instance via MAC CE or RRC signaling).

In one embodiment, the network may additionally or alternatively allocate feedback resources for the (HARQ) feedback on the attempt to acquire a GNSS position estimate before completion of the measurement gap. This may allow a "fast" UE (i.e. a UE which is able to quickly obtain a GNSS position estimate in the measurement gap) to report a successful GNSS measurement early without having to wait for the whole measurement gap duration and an additional feedback delay of the second feedback resource. For instance, in the MAC-CE scheduling the GNSS measurement gap (see action 503), the network may indicate a offset or an advance by a number K3 of timer resources (e.g. slots) to define the second feedback resource to be at n+X+MG−K3, where the K3 indicates the respective offset before the end of the measurement gap 506. Therein, the indication of this resource or offset may also be given based on (e.g. as a scaling K3_scale of) the duration MG of the measurement gap 506, so that the second feedback resource could for instance be allocated at time resource (e.g. slot) n+X+ceil (MG*K3_scale).

If the feedback transmitted via the second feedback resource contains one information bit, only an update regarding the state (ACK or NACK) of the acquisition of a new position estimate can be transmitted. In one embodiment, the (HARQ) feedback may contain more than one information bit, so that the UE may use these bits to also provide information about the validity timer or duration. For instance, the UE may provide information about the validity timer or duration, e.g. indicate a change to the GNSS validity timer. For example, assuming the use of 2 bits, the UE may signal four states (00, 01, 10, 11), such as UE failed to re-acquire the GNSS position fix
    UE acquired a new GNSS position fix, but the GNSS validity timer shall be reduced by 1 index in the GNSS-ValidityDuration IE, e.g. from 40 s to 30 s
    UE acquired the GNSS position fix, but the GNSS validity timer shall be increased by 1 index in the GNSS-ValidityDuration IE, e.g. from 60 s to 5 minutes
    UE acquired the GNSS position fix and the GNSS validity timer remains the same The described embodiments in particular enable the UE to efficiently inform the network about the outcome of a GNSS position fix by reuse of the HARQ process' feedback. The network signaling overhead is minimized by using the GNSS measurement gap configuration signaling (in MAC CE) to also configure the feedback resource. The UE is allowed to determine whether to provide an updated (longer) GNSS validity timer as compared to the previously reported value and thus further reduce the signaling overhead and energy consumption.

Figure 8:
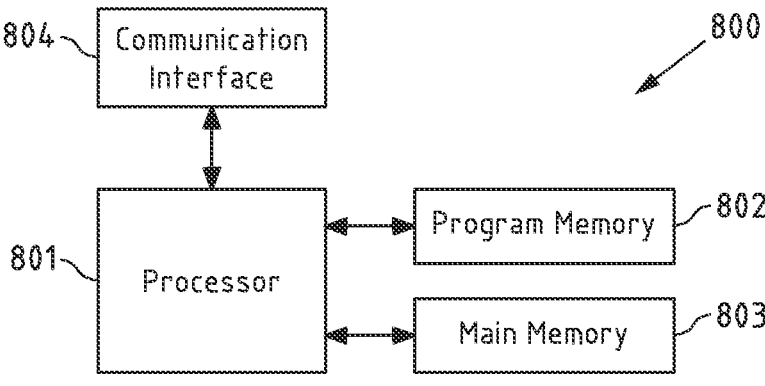
FIG. 8 shows a schematic diagram illustrating a block diagram of an exemplary embodiment of an apparatus according to the present disclosure.

Turning now to FIG. 8, there is shown a block diagram of an exemplary embodiment of an apparatus or UE 800 according to the present disclosure. For example, UE 800 may be one of a smartphone, a tablet computer, a notebook computer, a smart watch, a smart band, an LPWAN device, an IoT device, an eMTC device or a vehicle or a part thereof.

UE 800 comprises a processor 801. Processor 801 may represent a single processor or two or more processors, which are for instance at least partially coupled, for instance via a bus. Processor 801 executes a program code stored in program memory 802 (for instance program code causing mobile device 800 in connection with a network entity or base station) to perform one or more of the embodiments of a method according to the present disclosure or parts thereof, when executed on processor 801, and interfaces with a main memory 803. Program memory 802 may also contain an operating system for processor 801. Some or all of memories 802 and 803 may also be included into processor 801.

One of or both of a main memory and a program memory of a processor (e.g. program memory 802 and main memory 803) could be fixedly connected to the processor (e.g. processor 801) or at least partially removable from the processor, for instance in the form of a memory card or stick.

A program memory (e.g. program memory 802) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 803) may for instance be a volatile memory. It may for instance be a DRAM memory, to give non-limiting example. It may for instance be used as a working memory for processor 801 when executing an operating system, an application, a program, and/or the like.

Processor 801 further controls a communication interface 804 (e.g. radio interface) configured to receive and/or transmit data and/or information. For instance, communication interface 804 may be configured to transmit and/or receive radio signals from a radio node, such as a base station, in particular as described herein. Communication interface 804 may in particular be configured for communication with an NTN and with a GNSS. However, it may not be possible to operate communication interface for communication with the NTN and with the GNSS at the same time. It is to be understood that any computer program code based processing required for receiving and/or evaluating radio signals may be stored in an own memory of communication interface 804 and executed by an own processor of communication interface 804 and/or it may be stored for example in memory 803 and executed for example by processor 801.

Additionally, the communication interface 804 may further comprise a BLE and/or Bluetooth radio interface including a BLE transmitter, receiver or transceiver. For example, radio interface 804 may additionally or alternatively comprise a WLAN radio interface including at least a WLAN transmitter, receiver or transceiver.

The components 802 to 804 of terminal device 800 may for instance be connected with processor 801 by means of one or more serial and/or parallel busses.

It is to be understood that terminal device 800 may comprise various other components. For example, terminal device 800 may optionally comprise a user interface (e.g. a touch-sensitive display, a keyboard, a touchpad, a display, etc.).

Figure 9:
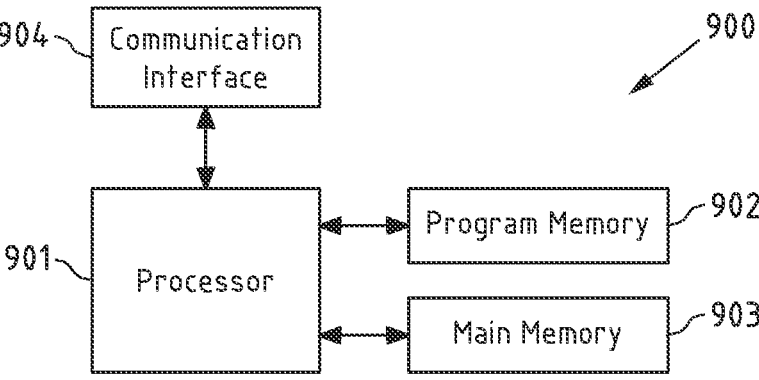
FIG. 9 shows a block diagram of an exemplary embodiment of a base station.

FIG. 9 is a block diagram of an exemplary embodiment of a network entity 900, such as a base station (in particular a non-terrestrial network entity or gNB). For instance, network entity 900 may be configured for scheduling and/or transmitting signals to the UE, as described above.

Network entity 900 comprises a processor 901. Processor 901 may represent a single processor or two or more processors, which are for instance at least partially coupled, for instance via a bus. Processor 901 executes a program code stored in program memory 902 (for instance program code causing network entity 900 to perform alone or together with the apparatus 800 embodiments according to the present disclosure or parts thereof), and interfaces with a main memory 903.

Program memory 902 may also comprise an operating system for processor 901. Some or all of memories 902 and 903 may also be included into processor 901.

Moreover, processor 901 controls a communication interface 904 which is for example configured to communicate according to a cellular communication system like a 2G/3G/4G/5G cellular communication system. Communication interface 904 of apparatus 900 may be realized by radio heads for instance and may be provided for communication between network entity and the apparatus, as described above.

The components 902 to 904 of network entity 900 may for instance be connected with processor 901 by means of one or more serial and/or parallel busses.

It is to be understood that apparatuses 800, 900 may comprise various other components.

Figure 10:
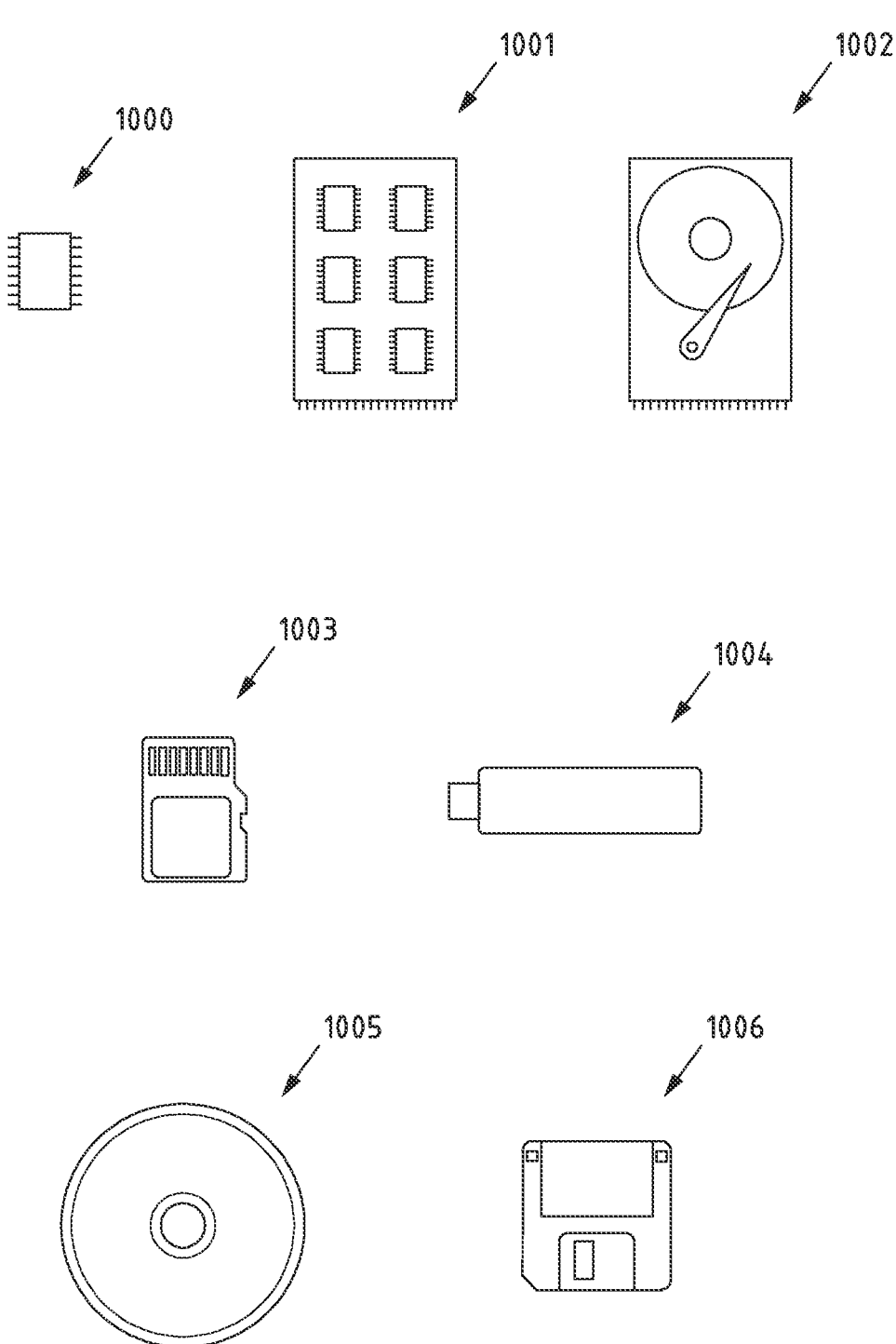
FIG. 10 shows a schematic illustration of examples of tangible and non-transitory computer-readable storage media.

FIG. 10 is a schematic illustration of examples of tangible and non-transitory computer-readable storage media according to the present disclosure that may for instance be used to implement memory 802 of FIG. 8 or memory 902 of FIG. 9. To this end, FIG. 10 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

The following embodiments are also disclosed:

1. An apparatus for communication with a non-terrestrial network, NTN, the apparatus comprising means configured for:
   receiving, from the network, a measurement gap configuration signaling at least comprising a measurement gap configuration indicating a measurement gap for acquiring a position estimate of the apparatus;
   receiving, from the network, as part of the measurement gap configuration signaling, an allocation indicating a feedback resource for providing feedback on an attempt to acquire a position estimate;
   attempting to acquire a position estimate of the apparatus during said measurement gap; and
   transmitting, to the network, a feedback on the acquisition of the position estimate using said feedback resource for providing feedback on the attempt to acquire a position estimate.

2. The apparatus of embodiment 1, wherein the means are further configured for:
   receiving, from the network, as part of the measurement gap configuration signaling, an allocation indicating a feedback resource for providing feedback on the reception of the measurement gap configuration; and
   transmitting, to the network, before the measurement gap, a feedback on the reception of the measurement gap configuration using said feedback resource for providing feedback on the reception of the measurement gap configuration.

3. The apparatus of embodiment 1 or 2, wherein the feedback resource for providing feedback on the reception of the measurement gap configuration is a first HARQ feedback resource of a HARQ process associated with the measurement gap configuration signaling.

4. The apparatus of embodiment 3, wherein the feedback resource for providing feedback on the attempt to acquire a position estimate is a second HARQ feedback resource of the HARQ process associated with the measurement gap configuration signaling.

5. The apparatus of any of any of embodiments 1-4, wherein the feedback resource for providing a feedback on the attempt to acquire a position estimate comprises a resource scheduled within the measurement gap and/or a resource scheduled after the measurement gap.

6. The apparatus of any of embodiments 1-5, wherein the means are further configured for
   in case a position estimate of the apparatus is acquired during said measurement gap, determining whether and/or how to transmit validity information indicating a validity duration of said acquired position estimate to the network.

7. The apparatus of embodiment 6, wherein said determining whether and/or how to transmit said validity information is based on one or more of
   the validity duration of said acquired position estimate;
   the validity duration of the previous position estimate;

a comparison of the validity duration of said acquired position estimate and the validity duration of the previous position estimate;
   a required remaining connection time; and
   a comparison of a required remaining connection time and the validity duration of the previous position estimate.

8. The apparatus of any of embodiments 1-7, wherein the means are further configured for, in case a position estimate of the apparatus is acquired during said measurement gap,
   transmitting an acknowledgement of an acquisition of the position estimate as said feedback on the attempt to acquire a position estimate, in case the validity duration of said acquired position estimate is the same or longer than the validity duration of the previous position estimate; and/or
   transmitting a negative acknowledgement of an acquisition of the position estimate as said feedback on the attempt to acquire a position estimate, in case the validity duration of said acquired position estimate is smaller than the validity duration of the previous position estimate.

9. The apparatus of any of embodiments 1-8, wherein said feedback on the attempt to acquire a position estimate is configured to indicate one or more of:
   an acknowledgement of an acquisition of the position estimate;
   a negative acknowledgement of an acquisition of the position estimate;
   whether there is a change of a validity duration of an acquired position estimate;
   a change of a validity duration of an acquired position estimate relative to the validity duration of the previous position estimate.

10. The apparatus of any of embodiments 1-9, wherein the means are further configured for
   in case a position estimate of the apparatus is acquired during said measurement gap, transmitting, to the network, validity information indicating a validity duration of the acquired position estimate.

11. The apparatus of embodiment 10, wherein the validity information indicating a validity duration of the acquired position estimate is transmitted to the network
   attached to data to be transmitted;
   in response to a scheduling grant;
   in a MAC CE;
   via RRC signaling; and/or
   in the feedback on the attempt to acquire a position estimate.

12. The apparatus of any of embodiments 1-11, wherein the measurement gap configuration is received in a medium access control, MAC, control element, CE.

13. The apparatus of any of embodiments 1-12, wherein said measurement gap configuration signaling comprises a scheduling message for receiving the measurement gap configuration.

14. The apparatus of any of embodiments 1-13, wherein the means are further configured for, in case a position estimate of the apparatus is acquired, one or more of:
   estimating a round trip time, RTT, based on the acquired position estimate;
   determining a timing offset based on the acquired position estimate;
   compensating a timing offset based on the acquired position estimate; and/or transmitting data based on a determined timing offset having been determined based on the acquired position estimate.

15. The apparatus of any of embodiments 1-14, wherein the apparatus is or is part of one or more of the following:

a wireless terminal;

an low power wide area network LPWAN device;

an NB-IoT device; and/or an eMTC device.

16. A network entity of a non-terrestrial network, NTN, the network entity comprising means configured for:

transmitting, to an apparatus, a measurement gap configuration signaling at least comprising a measurement gap configuration indicating a measurement gap for acquiring a position estimate of the apparatus;

transmitting, to the apparatus, as part of the measurement gap configuration signaling, an allocation indicating a feedback resource for providing feedback on the acquisition of the position estimate;

receiving, from the apparatus using said feedback resource for providing feedback on an attempt to acquire a position estimate, a feedback on an attempt to acquire a position estimate during said measurement gap by the apparatus.

17. The network entity of embodiment 16, wherein the means are further configured to, based on the received feedback on an attempt to acquire a position estimate during said measurement gap, schedule a resource for the apparatus to transmit validity information indicating a validity duration of a position estimate acquired by the apparatus.

18. A method, performed by at least one apparatus, the method comprising:

receiving, from the network, a measurement gap configuration signaling at least comprising a measurement gap configuration indicating a measurement gap for acquiring a position estimate of the apparatus;

receiving, from the network, as part of the measurement gap configuration signaling, an allocation indicating a feedback resource for providing feedback on an attempt to acquire a position estimate;

attempting to acquire a position estimate of the apparatus during said measurement gap; and transmitting, to the network, a feedback on the acquisition of the position estimate using said second feedback resource.

19. A method, performed by at least one network entity, the method comprising:

transmitting, to an apparatus, a measurement gap configuration signaling at least comprising a measurement gap configuration indicating a measurement gap for acquiring a position estimate of the apparatus;

transmitting, to the apparatus, as part of the measurement gap configuration signaling, an allocation indicating a feedback resource for providing feedback on an attempt to acquire a position estimate;

receiving, from the apparatus using said feedback resource for providing feedback on an attempt to acquire a position estimate, a feedback on an attempt to acquire a position estimate during said measurement gap by the apparatus.

20. Computer program code, the computer program code when executed by a processor of an apparatus causing said apparatus to perform a method of embodiment 18 or 19.

21. Computer storage medium comprising computer program code of embodiment 20.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 801 and 901 of FIGS. 8 and 9, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus for communication with a non-terrestrial network, NTN, the apparatus comprising: at least one processor, and at least one memory including a computer program code, wherein the at least one memory and the computer program code are configured, with the at least one processor, to cause the apparatus to:

receive, from a network, a measurement gap configuration signaling at least comprising a measurement gap configuration indicating a measurement gap for acquiring a position estimate of the apparatus;

receive, from the network, as part of the measurement gap configuration signaling, an allocation indicating a feedback resource for providing feedback on the reception of the measurement gap configuration;

receive, from the network, as part of the measurement gap configuration signaling, an allocation indicating a feedback resource for providing feedback on an attempt to acquire a position estimate;

attempt to acquire a position estimate of the apparatus during said measurement gap;

transmit, to the network, before the measurement gap, a feedback on the reception of the measurement gap configuration using said feedback resource for providing feedback on the reception of the measurement gap configuration; and transmit, to the network, a feedback on the acquisition of the position estimate using said feedback resource for providing feedback on the attempt to acquire a position estimate.

2. The apparatus of claim 1, wherein the feedback resource for providing feedback on the reception of the measurement gap configuration is a first HARQ feedback resource of a HARQ process associated with the measurement gap configuration signaling.

3. The apparatus of claim 2, wherein the feedback resource for providing feedback on the attempt to acquire a position estimate is a second HARQ feedback resource of the HARQ process associated with the measurement gap configuration signaling.

4. The apparatus of claim 1, wherein the feedback resource for providing a feedback on the attempt to acquire a position estimate comprises a resource scheduled within the measurement gap and/or a resource scheduled after the measurement gap.

5. The apparatus of claim 1, wherein the apparatus is further caused to in case a position estimate of the apparatus is acquired during said measurement gap, determine whether and/or how to transmit validity information indicating a validity duration of said acquired position estimate to the network.

6. The apparatus of claim 5, wherein said determining whether and/or how to transmit said validity information is based on one or more of the validity duration of said acquired position estimate;

the validity duration of the previous position estimate;

a comparison of the validity duration of said acquired position estimate and the validity duration of the previous position estimate;

a required remaining connection time; and a comparison of a required remaining connection time and the validity duration of the previous position estimate.

7. The apparatus of claim 1, wherein the apparatus is further caused to, in case a position estimate of the apparatus is acquired during said measurement gap, transmit an acknowledgement of an acquisition of the position estimate as said feedback on the attempt to acquire a position estimate, in case the validity duration of said acquired position estimate is the same or longer than the validity duration of the previous position estimate; and/or transmit a negative acknowledgement of an acquisition of the position estimate as said feedback on the attempt to acquire a position estimate, in case the validity duration of said acquired position estimate is smaller than the validity duration of the previous position estimate.

8. The apparatus of claim 1, wherein said feedback on the attempt to acquire a position estimate is configured to indicate one or more of:

an acknowledgement of an acquisition of the position estimate;

a negative acknowledgement of an acquisition of the position estimate;

whether there is a change of a validity duration of an acquired position estimate;

a change of a validity duration of an acquired position estimate relative to the validity duration of the previous position estimate.

9. The apparatus of claim 1, wherein the apparatus is further caused to in case a position estimate of the apparatus is acquired during said measurement gap, transmit, to the network, validity information indicating a validity duration of the acquired position estimate.

10. The apparatus of claim 9, wherein the validity information indicating a validity duration of the acquired position estimate is transmitted to the network attached to data to be transmitted;

in response to a scheduling grant;

in a MAC CE;

via RRC signaling; and/or in the feedback on the attempt to acquire a position estimate.

11. The apparatus of claim 1, wherein the measurement gap configuration is received in a medium access control, MAC, control element, CE.

12. The apparatus of claim 1, wherein said measurement gap configuration signaling comprises a scheduling message for receiving the measurement gap configuration.

13. The apparatus of claim 1, wherein the apparatus is further caused to, in case a position estimate of the apparatus is acquired, one or more of:

estimate a round trip time, RTT, based on the acquired position estimate;

determine a timing offset based on the acquired position estimate;

compensate a timing offset based on the acquired position estimate; and/or transmit data based on a determined timing offset having been determined based on the acquired position estimate.

14. The apparatus of claim 1, wherein the apparatus is or is part of one or more of the following:

a wireless terminal;

an low power wide area network LPWAN device;

an NB-IoT device; and/or an eMTC device.

15. A network entity of a non-terrestrial network, NTN, the network entity comprising: at least one processor, and at least one memory including a computer program code, wherein the at least one memory and the computer program code are configured, with the at least one processor, to cause the network entity to:

transmit, to an apparatus, a measurement gap configuration signaling at least comprising a measurement gap configuration indicating a measurement gap for acquiring a position estimate of the apparatus;

transmit, to the apparatus, as part of the measurement gap configuration signaling, an allocation indicating a feedback resource for providing feedback on the reception of the measurement gap configuration;

transmit, to the apparatus, as part of the measurement gap configuration signaling, an allocation indicating a feedback resource for providing feedback on the acquisition of the position estimate;

receive, from the apparatus, before the measurement gap, a feedback on the reception of the measurement gap configuration using said feedback resource for providing feedback on the reception of the measurement gap configuration; and receive, from the apparatus using said feedback resource for providing feedback on an attempt to acquire a position estimate, a feedback on an attempt to acquire a position estimate during said measurement gap by the apparatus.

16. The network entity of claim 15, wherein the network entity is further caused to, based on the received feedback on an attempt to acquire a position estimate during said measurement gap, schedule a resource for the apparatus to transmit validity information indicating a validity duration of a position estimate acquired by the apparatus.

17. A method, performed by at least one apparatus, the method comprising:

receiving, from a network, a measurement gap configuration signaling at least comprising a measurement gap configuration indicating a measurement gap for acquiring a position estimate of the apparatus;

receiving, from the network, as part of the measurement gap configuration signaling, an allocation indicating a feedback resource for providing feedback on the reception of the measurement gap configuration;

receiving, from the network, as part of the measurement gap configuration signaling, an allocation indicating a feedback resource for providing feedback on an attempt to acquire a position estimate;

attempting to acquire a position estimate of the apparatus during said measurement gap;

transmitting, to the network, before the measurement gap, a feedback on the reception of the measurement gap configuration using said feedback resource for providing feedback on the reception of the measurement gap configuration; and transmitting, to the network, a feedback on the acquisition of the position estimate using said second feedback resource.

* * * * *